W. MAECHLER.
ANIMAL TRAP.
APPLICATION FILED MAY 23, 1908.

912,863.

Patented Feb. 16, 1909.

Witnesses
M. A. Schmidt
Geo. E. Tew

Inventor
Walter Maechler
By Milo B. Stevens & Co
Attorneys

UNITED STATES PATENT OFFICE.

WALTER MAECHLER, OF CHICAGO, ILLINOIS.

ANIMAL-TRAP.

No. 912,863.　　　　Specification of Letters Patent.　　　　Patented Feb. 16, 1909.

Application filed May 23, 1908. Serial No. 434,567.

*To all whom it may concern:*

Be it known that I, WALTER MAECHLER, a citizen of the United States, residing at Chicago, in the county of Cook and State of Illinois, have invented certain new and useful Improvements in Animal-Traps, of which the following is a specification.

This invention is an animal trap particularly intended for catching mice and rats, and has for its object to provide an improved construction having novel features with respect particularly to the trap door and the means for holding the bait.

Figure 1:
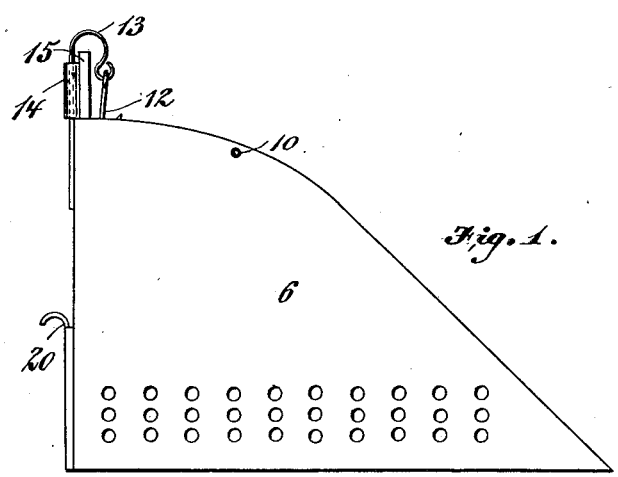
Figure 2:
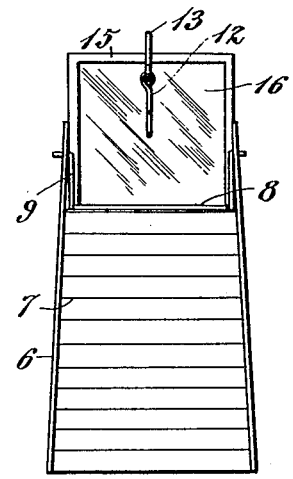
Figure 3:
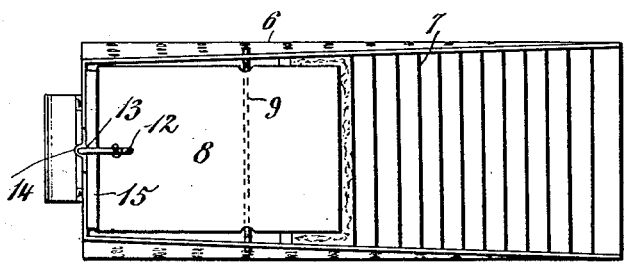
Figure 4:
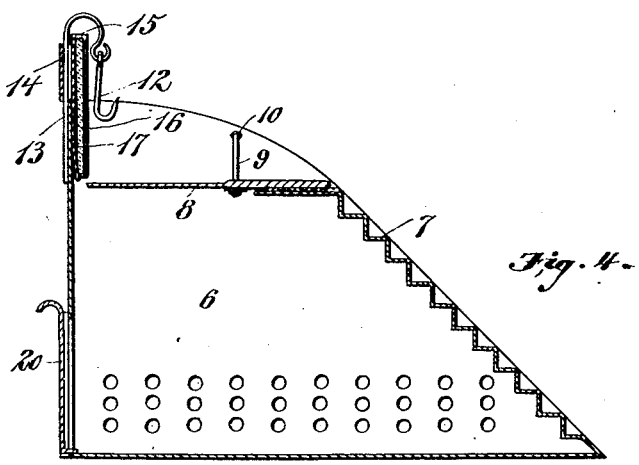

The invention is illustrated in the accompanying drawings, in which,

Figure 1 is a side elevation of the trap; Fig. 2 is an end elevation; Fig. 3 is a top plan view; and Fig. 4 is a vertical longitudinal section.

Referring specifically to the drawings, 6 indicates a box one end wall of which is inclined and formed with steps 7 for the approach of the animals to the trap door 8 at the top. This door is suspended by means of a U-shaped hanger 9 on which the trap is pivoted, so that its inner or rear end will drop under the weight of the animal, and the animal will fall into the box below. The upper ends of the arm of the hanger 9 are offset and pivotally hung in holes 10 in the opposite sides of the box. In consequence of this construction the trap door has a turning movement on its own pivot and also a swinging or oscillating movement on the pivots of the hanger 9, producing a very effective action, since when the animal steps on the drop the door swings down and also laterally, giving a drop which completely removes the support from under the animal and insures its fall into the box below. The front end of the door is, of course, sufficiently weighted to cause the door to close or become reset as soon as the animal falls.

The bait is hung by a hook 12 supported by an upright piece 13 which extends under or through a strap 14 on the back of a plate 15 which holds a mirror 16 behind the bait hook. The plate is slitted and bent out as at 17 to form a spring, and the mirror and plate are supported by the rear end of the box, being placed thereon so that the upper edge of said wall will enter between the spring 17 and the standard 13 which form a clip embracing the upper edge of the wall of the box and so holding the parts in place. The bait is placed on the hook which hangs before the mirror, and the animal, on reaching the top of the steps and seeing his reflection in the mirror, will approach the bait quickly in the belief that the image in the mirror is another animal. The rear end of the box is provided with a sliding door 20 for the removal of the trapped animals.

I claim:

1. An animal trap provided with a trap door or fall, and a hanger supporting the same, the door being pivoted to turn on the hanger, and the hanger being pivoted above the door, to swing therewith.

2. An animal trap comprising a box, a trap door at the top thereof, and a hanger on which the door is pivoted, the hanger having arms extending upwardly above the door and pivoted at their upper ends to the sides of the box.

3. An animal trap comprising a box, a trap door at the top thereof, a mirror frame behind the door, a standard attached to the back of the frame and provided with a bait hook in front of the mirror, the frame and standard forming a clip which clasps the upper edge of the end wall of the box.

In testimony whereof I affix my signature, in presence of two witnesses.

WALTER MAECHLER.

Witnesses:
　NELLIE FELTSKOG,
　H. G. BATCHELOR.